United States Patent [19]
Perlman et al.

[11] Patent Number: 5,150,360
[45] Date of Patent: Sep. 22, 1992

[54] UTILIZATION OF REDUNDANT LINKS IN BRIDGED NETWORKS

[75] Inventors: Radia J. Perlman, Acton; William Hawe, Pepperell; Anthony Lauck, Wellesley, all of Mass.

[73] Assignee: Digital Equipment Corporation, Maynard, Mass.

[21] Appl. No.: 489,910

[22] Filed: Mar. 7, 1990

[51] Int. Cl.[5] .............................................. H04J 3/24
[52] U.S. Cl. .............................. 370/94.3; 340/825.02
[58] Field of Search ........................ 370/94.3, 94.1, 60, 370/85.13, 85.14, 85.15, 85.12, 85.9; 340/825.02, 825.5, 825.51, 825.52; 379/17

[56] References Cited

U.S. PATENT DOCUMENTS

| | | | |
|---|---|---|---|
| 4,597,078 | 6/1986 | Kempf ................................. | 370/94.1 |
| 4,627,052 | 12/1986 | Hoare et al. ....................... | 370/85.13 |
| 4,706,080 | 11/1987 | Sincoskie .......................... | 340/824.02 |
| 4,707,827 | 11/1987 | Bione et al. ....................... | 370/85.13 |
| 4,737,953 | 4/1988 | Kock et al. ........................ | 370/94.1 |
| 4,740,954 | 4/1988 | Cotton et al. ..................... | 370/62 |
| 4,809,265 | 2/1989 | Hart et al. ......................... | 370/85.13 |
| 4,811,337 | 3/1989 | Hart .................................. | 370/85.13 |
| 4,831,620 | 5/1989 | Conway et al. ................... | 370/85.13 |
| 4,864,559 | 9/1989 | Perlman ............................. | 370/94.3 |
| 4,897,841 | 1/1990 | Gang, Jr. ........................... | 370/85.13 |
| 4,972,409 | 11/1990 | Backes ............................... | 370/94.1 |
| 5,003,531 | 3/1991 | Farinholt et al. .................. | 370/16 |
| 5,018,133 | 5/1991 | Tsukakoshi et al. .............. | 370/94.3 |
| 5,079,767 | 1/1992 | Perlman ............................. | 370/94.3 |
| 5,081,621 | 1/1992 | Sugimoto .......................... | 370/85.12 |
| 5,088,091 | 2/1992 | Schroeder et al. ................. | 370/94.3 |

Primary Examiner—Douglas W. Olms
Assistant Examiner—Dang Ton
Attorney, Agent, or Firm—A. Sidney Johnston; Ronald E. Myrick; Barry N. Young

[57] ABSTRACT

A method and related apparatus for establishing a point-to-point cross-link between two bridges in a bridged communication network. The bridged communication network is first configured in a loop-free arrangement by a spanning tree algorithm that selects which links of every bridge to activate in order to form the spanning tree active configuration. Then at least one cross-link not defined by the spanning tree configuration is established for routing of messages as an alternative to a spanning tree path. A protocol in each bridge ensures that no loops are formed and that only messages to preselected locations are passed over the cross-link. An optional optimization procedure measures message propagation times in both directions between the two bridges and over both the cross-link path and the spanning tree path, to determine whether to modify usage of the cross-link. Selection of the bridges for the formation of the cross-link, and selection of the destination stations for cross-link traffic, are independent of the location of a root bridge in the spanning tree configuration.

28 Claims, 4 Drawing Sheets

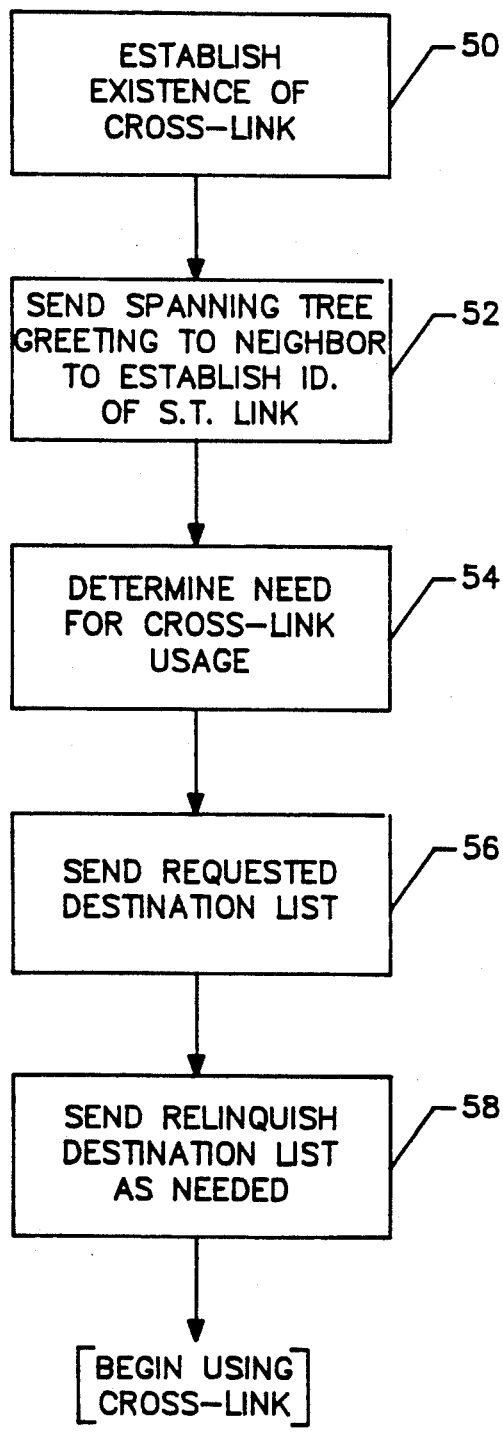
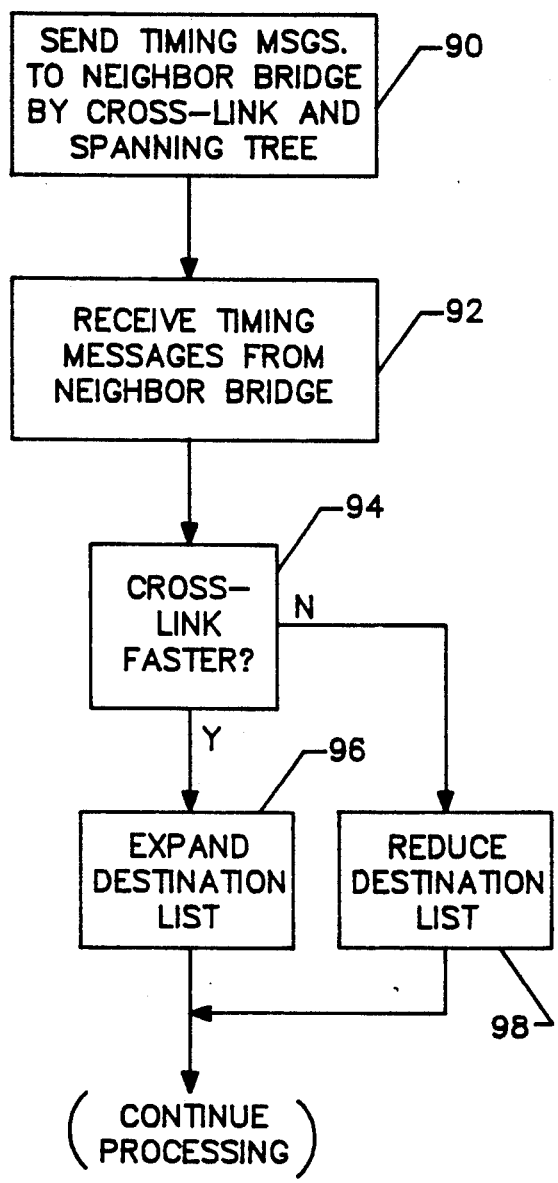

UTILIZATION OF REDUNDANT LINKS IN BRIDGED NETWORKS

BACKGROUND OF THE INVENTION

This invention relates generally to local area networks (LANs) of computers and, more particularly, to multiple LANs that are interconnected by bridges. A computer network is simply a collection of autonomous computers connected together to permit sharing of hardware and software resources, and to increase overall reliability. The qualifying term "local area" is usually applied to computer networks in which the computers are located in a single building or in nearby buildings, such as on a college campus or at a single corporate site. When the computers are further apart, the terms "wide area network" or "long haul network" are used, but the distinction is one of degree and the definitions sometimes overlap.

A bridge is a device that is connected to at least two LANs and serves to pass message frames between LANs, such that a source station on one LAN can transmit data to a destination station on another LAN, without concern for the location of the destination. Bridges are useful and necessary network components, principally because the total number of stations on a single LAN is limited. Bridges can be implemented to operate at a selected layer of protocol of the network. A detailed knowledge of network architecture is not needed for an understanding of this invention, but a brief description follows by way of further background.

As computer networks have developed, various approaches have been used in the choice of communication medium, network topology, message format, protocols for channel access, and so forth. Some of these approaches have emerged as de facto standards, but there is still no single standard for network communication. However, a model for network architectures has been proposed and widely accepted. It is known as the International Standards Organization (ISO) Open Systems Interconnection (OSI) reference model. The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level, in a "horizontal" direction.

The lowest layer defined by the OSI model is called the physical layer, and is concerned with transmitting raw data bits over the communication channel, and making sure that the data bits are received without error. Design of the physical layer involves issues of electrical, mechanical or optical engineering, depending on the medium used for the communication channel. The layer next to the physical layer is called the data link layer. The main task of the data link layer is to transform the physical layer, which interfaces directly with the channel medium, into a communication link that appears error-free to the next layer above, known as the network layer. The data link layer performs such functions as structuring data into packets or frames, and attaching control information to the packets or frames, such as checksums for error detection, and packet numbers.

Although the data link layer is primarily independent of the nature of the physical transmission medium, certain aspects of the data link layer function are more dependent on the transmission medium. For this reason, the data link layer in some network architectures is divided into two sublayers: a logical link control sublayer, which performs all medium-independent functions of the data link layer, and a media access control (MAC) layer. This layer, or sublayer, determines which station should get access to the communication channel when there are conflicting requests for access. The functions of the MAC layer are more likely to be dependent on the nature of the transmission medium.

Bridges may be designed to operate in the MAC sublayer. Further details may be found in "MAC Bridges," P802.1D/D6, Sept. 1988, a draft publication of IEEE Project 902 on Local and Metropolitan Area Network Standards.

The basic function of a bridge is to listen "promiscuously," i.e. to all message traffic on all LANs to which it is connected, and to forward each message it hears onto LANs other than the one from which the message was heard. Bridges also maintain a database of station locations, derived from the content of the messages being forwarded. Bridges are connected to LANs by paths known as "links." After a bridge has been in operation for some time, it can associate practically every station with a particular link connecting the bridge to a LAN, and can then forward messages in a more efficient manner, transmitting only over the appropriate link. The bridge can also recognize a message that does not need to be forwarded, because the source and destination stations are both reached through the same link. Except for its function of "learning" station locations, or at least station directions, the bridge operates basically as a message repeater.

As network topologies become more complex, with large numbers of LANs, and multiple bridges interconnecting them, operational difficulties can ensue if all possible LAN bridging connections are permitted. In particular, if several LANs are connected by bridges to form a closed loop, a message may be circulated back to the LAN from which it was originally transmitted, and multiple copies of the same message will be generated. In the worst case, messages will be duplicated to such a degree that the networks will be effectively clogged with these messages and unable to operate at all.

To prevent the formation of closed loops in bridged networks, IEEE draft publication P802.1D, referred to above, proposes a standard for a spanning tree algorithm that will connect the bridged network into a tree configuration, containing no closed loops, and spanning the entire network configuration. The spanning tree algorithm is executed periodically by the bridges on the interconnected network, to ensure that the tree structure is maintained, even if the physical configuration of the network changes. Basically, the bridges execute the spanning tree algorithm by sending special messages to each other to establish the identity of a "root" bridge. The root bridge is selected, for convenience, as the one with the smallest numerical identification. The algorithm determines which links of the bridges are to be closed and which are to be open, i.e. disabled, in configuring the tree structure. One more piece of terminology is needed to understand how the algorithm operates. Each LAN has a "designated" link, which means that one of the links connectable to the LAN is designated to carry traffic toward and away from the root bridge. The basis for this decision is similar to the basis for selecting the root bridge. The designated link is the one providing the least costly (shortest) path to the root bridge, with numerical bridge identification being used as a tie-breaker. Once the designated links are identified, the algorithm chooses two types of links to be activated or closed: first, for each LAN its designated link is chosen, and second, for each bridge a link that forms the "best path" to the root bridge is chosen, i.e. a link through which the bridge received a message giving the identity of the root bridge. All other links are opened. As will become clearer from an illustration in the following more detailed description, the algorithm results in interconnection of the LANs and bridges in a tree structure, i.e. one having no closed loops.

A disadvantage of the spanning tree configuration defined by the algorithm is that it fails to utilize redundant message paths that may be available, but are disabled, in the interconnected network. All message traffic is forced to follow a path through the tree structure. This path may, in some cases, be a long and tortuous one, even though a more direct path may be available through a point-to-point cross-link between two bridges, but outside the spanning tree structure. The reason that the more direct path is not used is that it may violate the rule against closed loops. Yet it will be apparent that some point-to-point cross-links between bridges represent useful message "shortcuts," which, if properly used, would increase the overall efficiency of the network. The spanning tree algorithm provides a simple solution to the problem of avoiding closed-loop message paths in interconnected networks, but the price for this convenience is a lower than optimum usage of the communication paths linking the interconnected LANs.

Hart U.S. Pat. No. 4,811,337 proposed a limited solution to this difficulty, but failed to recognize a more general solution. The Hart patent suggests that paths outside the spanning tree can be used to exchange message frames, in what the inventor refers to as distributed load sharing (DLS). As described in the patent, and also defined by the claims, the Hart invention has specific limitations. First, neither of the two bridges interfacing to the DLS or cross-link path may be the root bridge. Second, message frames transferred over the DLS path must be sent between stations that are further away from the root bridge than either bridge associated with the cross-link, or else the stations using the cross-link path must be connected directly to the local LANs of the cross-linked bridges.

The solution proposed by Hart not only limits the configurations that may utilize alternate communication paths in an interconnected network, but requires a complex set of rules to determine when a cross-link path may be formed. Clearly, a simpler approach would be desirable, and the present invention provides one.

SUMMARY OF THE INVENTION

The present invention resides in a method and related apparatus for utilizing redundant links in bridged networks, without regard to the location of the root bridge in a spanning tree defining a loop-free configuration of the network. Briefly, and in general terms, the method of the invention comprises the steps of determining whether a cross-link between two bridges exists, outside the spanning tree configuration, selecting in at least one of the two bridges a set of destination stations for receipt of messages to be transmitted over the cross-link, advising the other of the two bridges of the identities of the selected destination stations, examining each message received over the spanning tree at the other of the two bridges to determine if the intended destination of the message qualifies as one of the destination stations, and forwarding the message over the cross-link if the destination station in the message qualifies. The step of determining whether a cross-link exists is performed in part by exchanging cross-link greeting messages. Such a message is transmitted by each bridge in the network having inactive links not included in the spanning tree configuration, and is transmitted along each of the inactive links. The cross-link greeting contains the identity of the bridge transmitting the message. For a potential cross-link to exist, a cross-link greeting must be received at another bridge that has transmitted or will transmit such a message. In this way the existence of at least one cross-link between two bridges is established and each such bridge is made aware of the identity of the other.

Additionally, the method includes the step of transmitting a spanning tree greeting from each of the two bridges. This message is transmitted to the other bridge over the spanning tree configuration. The other bridge records the identity of a spanning tree link through which the spanning tree greeting is received. Thus, both bridges are aware of spanning tree links that lead to their opposite numbers in the cross-link.

In selecting a set of destinations for receipt of cross-link messages, the method of the invention includes the step of excluding stations that are reached through the spanning tree link through which the spanning tree greeting was received from the other bridge. The step of advising the other bridge of the identities of the selected destination stations includes the possibility of transmitting two types of messages: one adding to the set of selected destination stations, and the other removing selected stations from a set of previously selected destination stations.

In the disclosed form of the invention, the step of examining each message received over the spanning tree includes determining whether the received message was received through the spanning tree link through which the spanning tree greeting was routed from the other bridge, and, if so, dropping the received message as possibly invalid. The method also includes the steps of examining each message received at each bridge through the cross-link, determining if the message destination is valid, and, if so, transmitting the message toward its destination station.

In accordance with an optional feature of the invention, the method also includes the steps of transmitting from each of the two bridges a first timing message destined for the other bridge and coded for transmission over the cross-link, and a second timing message also destined for the other bridge, but coded for transmission over the spanning tree; then measuring the propagation times of the first and second messages, by observing the arrival times of the messages. Based on the measurement of the message propagation times, usage of the cross-link can be adjusted by modifying the set of destination stations associated with each of the bridges. For example, the set of destination stations can be expanded when the cross-link provides a faster message path than the spanning tree, and can be reduced when the spanning tree provides the faster path. This optimization procedure can be performed periodically, or only when the cross-link is first established, or based on an observed need to redistribute message traffic.

In terms of apparatus, the invention basically includes means for determining whether a cross-link between two bridges exists, outside the spanning tree configuration, means for selecting at one or each of the two bridges a set of destination stations for receipt of messages to be transmitted over the cross-link, means for advising the other of the two bridges of the identities of the selected destination stations, and means for examining each message received over the spanning tree at each of the two bridges to determine if the intended destination of the message qualifies as one of the destination stations selected by the other of the bridges. The apparatus also includes means for transmitting the message over the cross-link if the destination station in the message qualifies.

It will be appreciated from this summary that the present invention represents a significant advance in the field of bridged networks. In particular, the invention provides a simple and effective technique for using redundant communication links in an interconnected network, without forming closed loops, and without regard for the location and identity of the root bridge in a loop-free configuration defined by the spanning tree algorithm. The invention also provides for optimization of cross-link usage, based on the propagation times of messages forwarded through the cross-link and by the alternate spanning tree path. Other aspects and advantages of the invention will become apparent from the following more detailed description, taken in conjunction with the accompanying drawings.

BRIEF DESCRIPTION OF THE DRAWINGS

FIG. 5 is a simplified flowchart of the basic functions performed at each bridge in establishing a cross-link in accordance with the present invention;

FIG. 7 is a simplified flowchart of an optimization procedure optionally performed in each bridge to optimize usage of a cross-link between bridges.

DESCRIPTION OF THE PREFERRED EMBODIMENT

Figure 1:
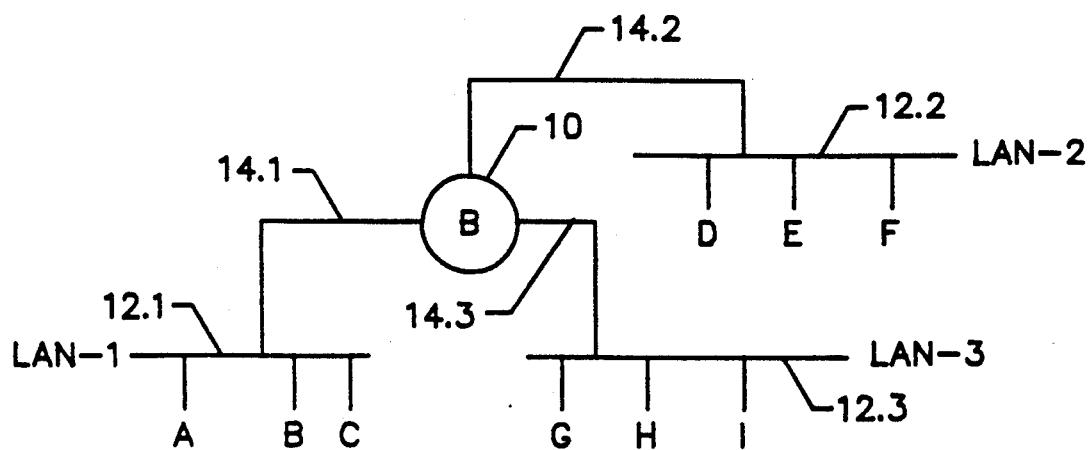
FIG. 1 is a block diagram showing the function of a bridge.

As shown in the drawings for purposes of illustration, the present invention is concerned with the utilization of redundant links in bridged computer networks. A bridge is a special-purpose computer station connected to more than one local-area network (LAN). The bridge listens to all messages on all of the networks to which it is connected, and forwards the messages to networks other than the ones from which they were received.

FIG. 1 shows the well known principle of a bridge B, indicated by reference numeral 10, connected to three LANs, LAN-1 (12.1), LAN-2 (12.2) and LAN-3 (12.3) by links 14.1, 14.2 and 14.3. The bridge 10 behaves as a station to each of the LANs to which it is connected, i.e. it follows the protocols for network access to those LANs. The bridge 10 also maintains a record of the observed directional locations of each station from which a message frame is received. For example, if a station A on LAN-1 transmits a message destined for station D on LAN-2, the bridge records that the message from station A was received over link 14.1. The message is retransmitted by the bridge 10 over all of its remaining links, i.e. links 14.2 and 14.3. If the bridge later receives a message destined for station A, from station G on LAN-3, for example, retransmission can be limited to the link 14.1 to LAN-1, since the bridge already "knows" that station A is located in this direction. After at least one message has been received from every station in the connected networks, the bridge 10 will have accumulated a record of the directional location of each station. Subsequent retransmissions by the bridge will be limited to a single communication link. If the destination station is recognized as being in the same direction as the source station from which the message emanated, the bridge will not forward the message at all.

Figure 2:
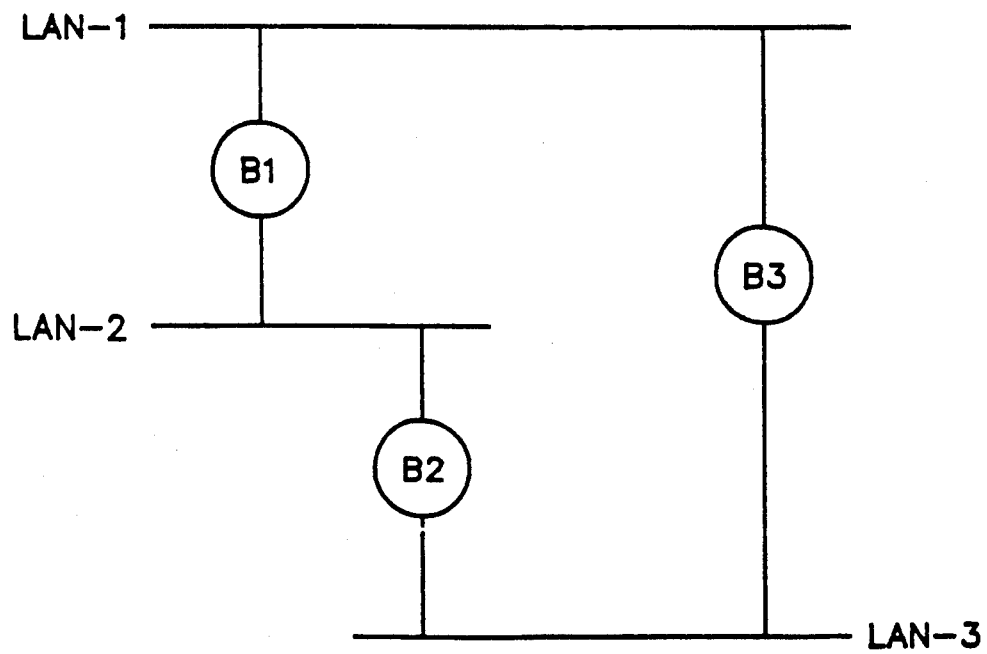
FIG. 2 is block diagram showing how bridged networks can be connected to form closed loops in an interconnected network.

A known difficulty of bridged networks is that closed loops formed by bridges and networks cause operating problems and are best avoided. As shown in FIG. 2, for example, a bridged network may include three LANs, referred to as LAN-1, LAN-2 and LAN-3, interconnected by three bridges B1, B2 and B3. Suppose bridge B1 is connected to LAN-1 and LAN-2, bridge B2 is connected to LAN-2 and LAN-3, and bridge B3 is connected to LAN-3 and LAN-1. If a message is transmitted from a station on LAN-1, it will be retransmitted by both B1 and B3. Bridge B2 will then receive the same message from both LAN-2 and LAN-3, and will be unable to determine the source direction of the message. The closed loop formed by the bridges B1, B2, B3 has the potential for generating multiple copies of the same message on a single LAN. In the worst case, a LAN can become bogged down with multiple copies of a single message, and be unable to function normally.

The avoidance of closed loops in bridged networks has been simplified by the availability of a spanning tree algorithm, which examines a network configuration of LANs and bridges, and arrives at an active configuration of the network that has no closed loops. A detailed description of the operation of this algorithm may be found in "MAC Bridges," P802.1D/D6, Sept. 1988, a draft publication of IEEE Project 902 on Local and Metropolitan Area Network Standards. A simplified description follows.

The spanning tree algorithm is executed periodically by all of the bridges in an interconnected network, to arrive at the active configuration, which may change as the physical configuration of the network changes. The algorithm basically performs its function in two steps. It first determines the identity of a root bridge. That is to say, the identity of the root bridge is agreed upon by all of the bridges. Then the links from the bridges to their associated LANs are selectively either activated or disabled, such that some of the bridges may be effectively disconnected from the network. The remaining bridges and links form the desired active configuration, which is a tree structure spanning the entire network and having no closed loops.

Figure 3:
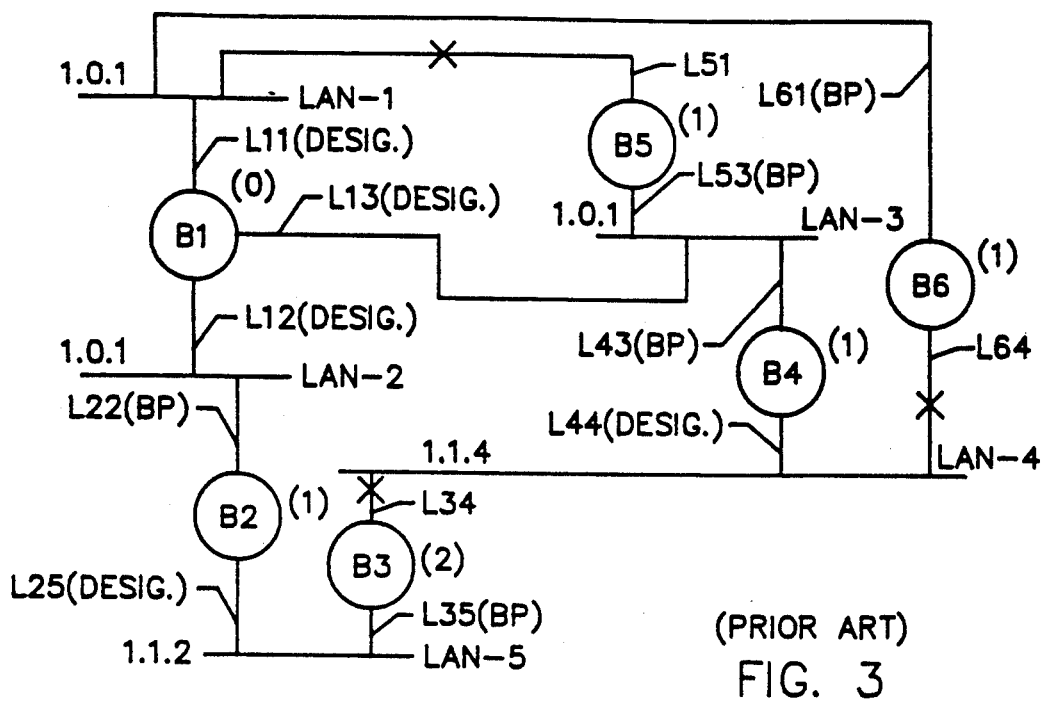
FIG. 3 is a block diagram of a bridged network, illustrating the operation of the spanning tree algorithm.

FIG. 3 shows an illustrative bridged network having five LANs, LAN-1, LAN-2, LAN-3, LAN-4 and LAN-5, and six bridges B1–B6. Each bridge except B1 happens to be linked to only two LANs, but this is not a limitation of the algorithm. The possible bridge links are as follows:

| |
|---|
| Bridge B1 has links to LAN-1, LAN-2 and LAN-3, |
| Bridge B2 has links to LAN-2 and LAN-5, |
| Bridge B3 has links to LAN-4 and LAN-5, |
| Bridge B4 has links to LAN-3 and LAN-4, |
| Bridge B5 has links to LAN-1 and LAN-3, and |
| Bridge B6 has links to LAN-1 and LAN-4. |

For convenience of reference, the links will be referred to by the letter L with a suffix concatenating the bridge number with the LAN number to which the link makes connection. Thus, the link between bridge B1 and LAN-3, for example, will be referred to as link L13. Clearly, if all of the bridge links were activated several closed loops would be formed. For example, one closed loop would be formed by bridges B1 and B5, linked to LAN-1 and LAN-3.

To determine which of the bridges will be the root bridge, the bridges all send "hello" messages to their neighboring bridges. Each "hello" message contains a proposed root identifier (id.), which is initially assumed by each bridge to be its own id. Ultimately, the bridge with the lowest id. will be selected as the root, but it is important to understand that the identity of the root bridge is really irrelevant and may be selected at random. The only requirement is that the bridges agree as to the identity of the root bridge. The use of a unique bridge id. for this purpose satisfies the requirement of agreement. The "hello" message protocol also determines the identity of a "designated" link for each of the LANs.

The format of the "hello" message includes the following three fields:

root id. cost. own id. = r.c.i

The "cost" is the cost of the shortest path between the bridge sending the message and the root bridge. This may be measured in a number of ways but may be best considered in this simplified example to be the number of "jumps" that are needed from one LAN to another, to traverse a path from the root bridge to the bridge sending the "hello" message. The number of jumps to the root bridge is indicated in parentheses next to each bridge. Initially each bridge will assume it is the root itself. B1 will send a "hello" message containing 1.0.1, and B2 will send one containing 2.0.2. When B2 receives B1's "hello" message, B2 will become aware of the existence of a lower root id. and will change its "hello" message to contain 1.1.2. The designated link for a given LAN is the one over which the smallest "hello" message field is received. LAN-2 receives 1.0.1 over link L12 from bridge B1, and receives 1.1.2 over link L22 from bridge B2. Therefore link L12 is selected as the designated link for LAN-2. A similar exchange occurs through LAN-3, to which bridges B1 and B5 are connected, and link L13 is selected as the designated link for LAN-3. In fact, another definition of the root bridge is that all of its links are designated links.

This process is performed at each of the LANs. The designated links for the other LANs are: link L11 for LAN-1, link L44 for LAN-4, and link L25 for LAN-5. The designated links are indicated by "(DESIG.)" following the link reference name. The links that are activated to form the spanning tree are of two types:
 (a) the designated links, and
 (b) links that form the best path to the root bridge for each bridge.

The best path to the root bridge is the path over which a bridge receives notification of the identity of the root bridge. For some bridges, such notification may be received from two or more paths, in which case a random selection must be made of one path. A link of type (b) may also be a designated link.

In the example of FIG. 3, the following links represent the best path to the root bridge, as indicated by "(BP)" following the link reference name:
 for B2, L22,
 for B3, L35 and L34 (L35 selected),
 for B4, L43,
 for B5, L51 and L53 (L53 selected), and
 for B6, L61.

The links that are not designated or that do not represent the best selected path to the root bridge are disabled, as indicated by X in the link. These are links L51, L34 and L64. The remaining configuration is the "active" configuration chosen by the spanning tree algorithm.

Although the spanning tree algorithm provides a convenient solution to the potential problems posed by closed loops in bridged networks, it does not always use all available message paths in the most effective way. Specifically, it may at times be desirable to use a point-to-point link between bridges, to provide a message "shortcut," but to do so would be a violation of the spanning tree algorithm. That is to say, the desired point-to-point link is outside the active configuration selected by the spanning tree algorithm. In this regard, it may be noted that a direct point-to-point link between two bridges is treated in the spanning tree algorithm in the same way as an additional LAN to which only two stations are connected, namely the two bridges.

Figure 4:
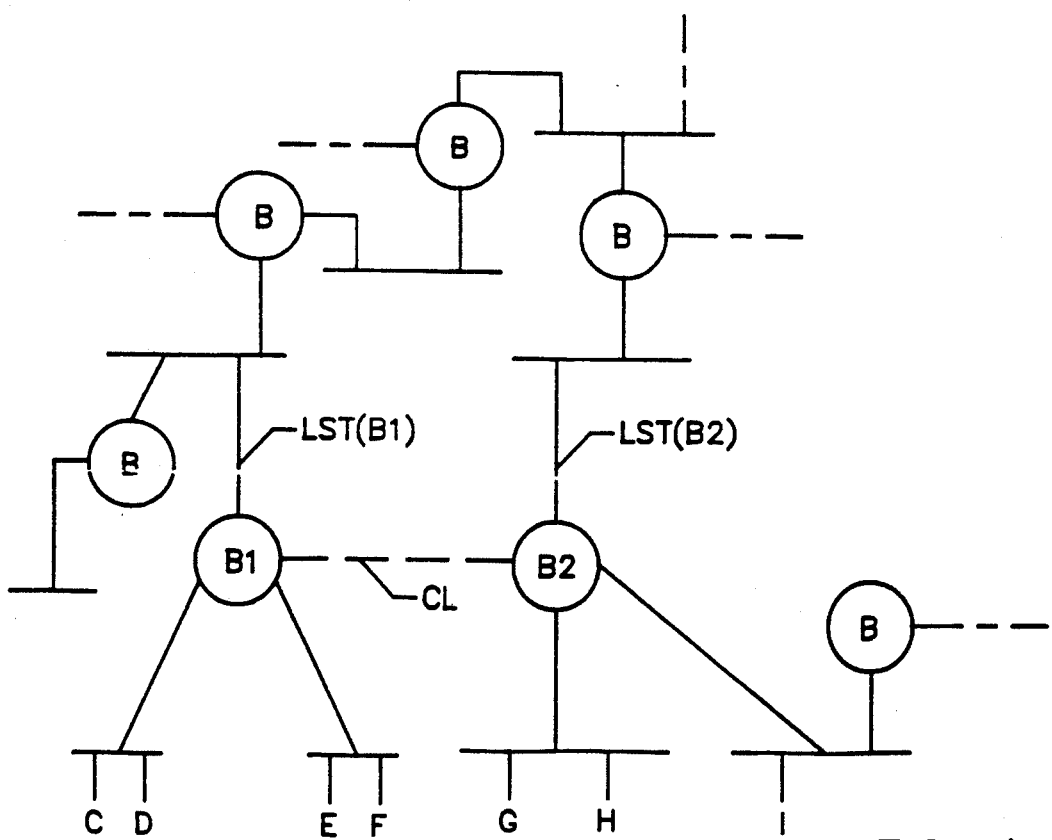
FIG. 4 is a block diagram of a portion of a bridged network, illustrating how a point-to-point cross-link may be established in accordance with the present invention.

In accordance with the invention, a point-to-point cross-link may be established between two bridges, even though the cross-link is outside the spanning tree active configuration, and regardless of the location of the root bridge relative to the two bridges. FIG. 4 is a fragmentary diagram of a bridged network having multiple bridges, indicated as circles containing the letter B, and multiple LANs, indicated as short horizontal lines. A possible point-to-point cross link is indicated by a broken line CL between bridges B1 and B2. The root bridge is not identified in the FIGURE, and its identity is not relevant to the protocol to be described.

Not all bridges may be capable of executing this new protocol for establishing cross-links. In fact, it is desirable for purposes of compatibility that the invention should operate even if there is a mix of "new" and "old" bridges, i.e. those with and without the new protocol.

Each bridge with the new protocol capability, for example bridge B1, performs the following functional steps to determine whether a cross-link can be established and how it should be modified. FIG. 5 is a simplified flowchart of the protocol executed in each bridge. After the spanning tree algorithm has been run, each bridge has one or more of its links activated, and zero or more of its links disabled. The activated links will be referred to as TREE links and the disabled or non-selected links will be referred to as NOT-TREE links.

The first step of the new protocol is, as shown in block 50 (FIG. 5), to establish the existence of a point-to-point cross-link. Each bridge having at least one NOT-TREE link transmits a CROSS-LINK GREETING (CLG) message on its NOT-TREE links only. The encoding of the CLG message is such that it will be ignored by "old" or standard bridges not having the new protocol. The purpose of the CLG message is to inform a neighbor bridge that the bridge transmitting the message considers the link over which the message is sent to be a cross-link. A secondary purpose of the CLG message is to inform a neighbor bridge of the identity of the bridge sending the message. Normally, both bridges at the ends of a cross-link will exchange CLG messages, and will thereby learn the identities of their neighbor bridges on the cross-link. If one of the bridges considers the link to be a tree link, this bridge will not initially send a CLG message, but upon receiving one, will then mark the link as a cross-link and will send a CLG message of its own.

Once the existence of a cross-link between two bridges is established, the two bridges exchange messages over the spanning tree, as indicated in block 52, by means of a SPANNING TREE GREETING (STG) message sent by each bridge on the conventional spanning tree configuration. The purpose of the STG message is to allow each of the bridges to identify a spanning tree link through which it can reach the other bridge through the spanning tree configuration. The identity of the spanning tree link leading to the other bridge of the cross-link will be referred to as spanning tree link LST. Both bridges record the LST identity for their neighbor bridge on the cross-link.

Next, and optionally, a determination is made in block 54 as to the extent to which the cross-link is to be used. As will be further discussed, this determination may be based on a comparison of message propagation times measured over the cross-link and the spanning tree, or may be omitted entirely. Before message transmission on the cross-link can begin, each bridge must identify destination stations that are available to receive cross-link message transmissions. Each bridge examines its list of stations that reside in the direction of spanning tree links other than link LST. From this list of stations, the bridge selects some, or all, for inclusion in a special REQUESTED DESTINATIONS message, as indicated in block 56, to be transmitted over link LST to the neighbor bridge. For bridge B1, stations C, D, E and F are possible destinations. Bridge B2 might specify stations G, H and I as destinations. As needed, the bridge may also transmit a RELINQUISH DESTINATIONS message in the same manner, as shown in block 58, to inform the other bridge of the identities of stations to be removed from the destination list. Each of the bridges maintains two lists of destinations, one of which is consistent with the REQUESTED and RELINQUISH messages received from the other bridge, and the other of which reflects this bridge's own destination selections.

Figure 6:
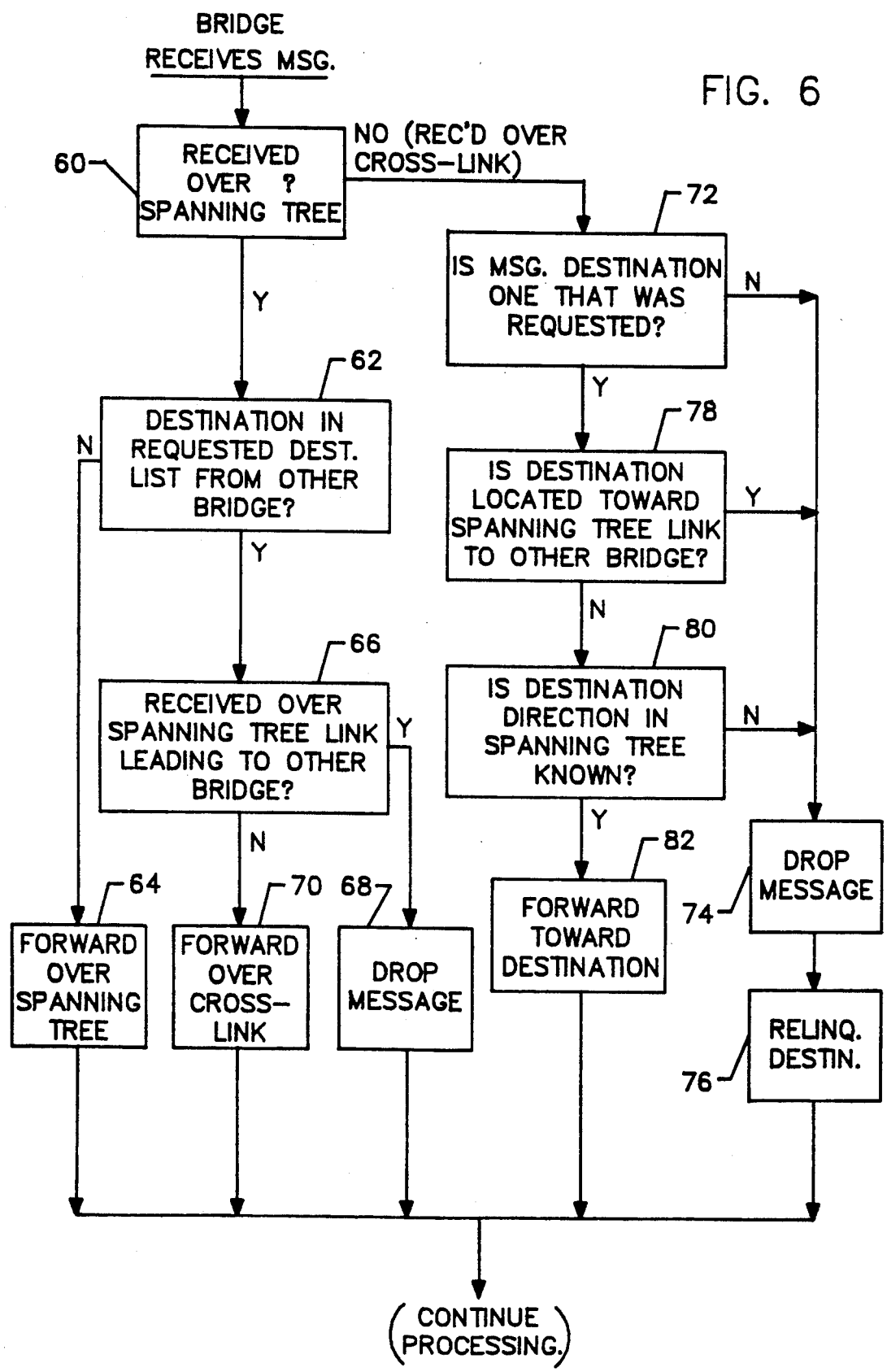
FIG. 6 is a simplified flowchart of the functions performed in each bridge at the end of a cross-link, when a message is received by the bridge.

At this point, a cross-link has been established between two bridges, each of which has a list of acceptable destination stations provided by the other bridge. Using the cross-link for the transmission of messages is now basically a matter of making sure that each message destination is one that is in the list provided by the bridge at the other end of the cross-link. If the destination is not one of those requested by the other bridge, the message is sent over the spanning tree configuration. If protocol errors are detected, a received message is in some instances dropped. FIG. 6 is a flowchart of the decisions to be made by each bridge when a message is received.

When a bridge receives a message frame, it is first determined, in block 60, whether the message was received over a spanning tree link. If not, it was received over the cross-link. If it was received over a spanning tree link, the message is potentially a candidate for forwarding over the cross-link. But first it is determined, in block 62, whether the destination contained in the message is one of the stations contained in the requested destination list maintained by the bridge, based on prior messages received from the other bridge. If the destination station is not on the destination list, the message is forwarded normally, over one or all of the other spanning tree links, as indicated in block 64.

If the destination is in the destination list, the bridge next determines, in block 66, whether the message was received over link LST to the other bridge. If it is, this indicates some type of protocol error, because there is no way for the bridge to forward the message without forming a closed loop, The message is apparently intended for a destination reached through the neighbor bridge, which can be reached from this bridge either through the cross-link or through the spanning tree link LST. Forwarding the message through any other spanning tree link would not effect delivery of the message to the neighbor bridge. Forwarding the message through the cross-link would deliver a duplicate message, since the received message came through the spanning tree from the direction of the other bridge. Therefore, a copy of the message must already be propagating through the spanning tree to the neighbor bridge. Accordingly, if the source of the message is the spanning tree link LST, as determined in block 66, the message is dropped, as indicated in block 68.

If the test in block 66 determines that the source of the message is other than spanning tree link LST, the message is forwarded over the cross-link, as indicated in block 70. Note that the determination of whether to use the cross-link is made without regard to the identity of the root bridge in the spanning tree. The identity of the root bridge was determined on an essentially arbitrary basis, so its identity is not critical to the use of cross-links in the bridged network. The determination of which stations may use the cross-link is made on the basis of the direction in which those stations lie in relation to the direction of the other bridge. Cross-link messages must emanate from stations reached through spanning tree links other than the one leading to the other bridge, and destination stations must be reached over spanning tree links other than the one leading to the other bridge.

If the message received by the bridge has come through the cross-link, as determined in block 60, some further validity tests are performed before forwarding the message to its destination. First, in block 72, it is determined whether the message destination is in the list that the receiving bridge generated for its neighbor. If not, a protocol error exists, since a message has apparently been sent over the cross-link to a destination not on the REQUESTED DESTINATIONS list. The received message is dropped, as indicated in block 74, and a message is sent to the other bridge, as shown in block 76, to relinquish this destination station from the list, since it would seem that the other bridge has the destination on its list in error.

Next, if the destination station is one requested by this bridge, the direction of the destination is checked in block 78. If the destination is in a direction over the spanning tree link LST to the other bridge, an error has been made. The message is dropped (block 74) and a message sent to relinquish the destination (block 76). Finally, if the direction of the destination is unknown to the bridge, as determined in block 80, the same error path is followed through blocks 74 and 76, since an error has occurred if the destination is on the list generated by the bridge but its direction is unknown. If all these validity tests are passed, the message is transmitted toward its intended destination, i.e. over the appropriate spanning tree link, as indicated in block 82.

Use of a point-to-point cross-link may be optimized by making transmission timing measurements using the regular spanning tree path and the cross-link path. To obtain these timing measurements, each bridge connected to a cross-link sends a timing message to its neighbor bridge over the alternate paths. This is indicated in block 90 of FIG. 7. Each timing message contains a system time tag to uniquely identify the message. Each bridge on the cross-link receives messages of this type from its neighbor, as indicated in block 92, and can determine from the time of receipt which message path was the faster one. A number of options are possible after this determination is made, in block 94. If the cross-link path is faster, the bridge receiving the timing messages may want to increase the number of stations in its destination list, as indicated in block 96, to take advantage of the faster message path. If the cross-link path is slower than the spanning tree path, the bridge receiving the timing messages may want to decrease the number of stations in its destination list, as indicated in block 98, to better distribute the message traffic between the cross-link path and the spanning tree path.

The timing optimization described above is performed in both directions through the cross-link and the spanning tree, so will take account of any directional asymmetry in the paths. Decisions pertaining to traffic in one direction between the two bridges will be based on timing measurements of messages transmitted in the same direction.

Optimization of cross-link usage, based on timing measurements, may be performed just once, or as needed, or periodically, or not at all. If the timing optimization is performed once when the link is first established, a decision could be made on the basis of this timing test as to whether the link is "useful" to at least one of the bridges. If so, all qualifying message traffic is routed through the cross-link. The optimization could be considered needed when the cross-link becomes congested with message traffic. Periodic optimization is another option for implementing this feature and, in some situations, the feature may be omitted entirely, with all qualifying message traffic being routed through the cross-link.

It will be appreciated from the foregoing that the present invention represents a significant improvement in the operation of bridged networks. In particular, the invention allows the use of point-to-point cross-links outside the active network configuration selected by the spanning tree algorithm. Further, the invention permits the use of such cross-links without regard to the identity and location of the root bridge of the spanning tree. An additional feature of the invention is the optimization of a point-to-point cross-link based on measurements of message transmission times through the cross-link and through the equivalent spanning tree path. It will also be appreciated that, although an embodiment of the invention has been described in detail for purposes of illustration, various modifications may be made without departing from the spirit and scope of the invention. Accordingly, the invention is not to be limited except as by the appended claims.

We claim:

1. In a bridged communication network that has been pruned to form a loop-free spanning tree configuration having a root bridge, a method of exchanging messages between stations, through a point-to-point cross-link outside the spanning tree configuration, the method comprising the steps of:

identifying a cross-link between any two bridges in the network, wherein the cross-link exists outside the spanning tree configuration;

selecting in at least one of the two bridges a set of destination stations for receipt of messages to be transmitted over the cross-link, the destination stations being selected without regard to their locations with respect to the root bridge in the spanning tree configuration;

advising the other of the two bridges of the identities of the selected destination stations;

examining each message received over the spanning tree at the other of the two bridges to determine if the intended destination of the message qualifies as one of the selected stations; and forwarding the message over the cross-link if the destination station in the message qualifies.

2. A method as defined in claim 1, wherein the step of identifying a cross-link includes the steps of:

transmitting a cross-link greeting message from each bridge in the network having inactive links not included in the spanning tree configuration, the cross-link greeting message being transmitted along each of the inactive links and containing the identity of the bridge transmitting the message; and receiving a cross-link greeting message in at least one bridge that transmitted such a message, wherein the existence of at least one cross-link between two bridges is established and each of the two bridges is made aware of the identity of the other.

3. A method as defined in claim 2, and further comprising, after identifying a cross-link, the steps of:

transmitting from each of the two bridges a spanning tree greeting message that is transmitted to the other bridge over the spanning tree configuration; and recording in each bridge the identity of a spanning tree link through which the spanning tree message from the other bridge is received.

4. A method as defined in claim 3, wherein the step of selecting a set of destinations includes the step of:

excluding stations that are reached through the spanning tree link through which the spanning tree greeting was received from the other bridge.

5. A method as defined in claim 1, wherein the step of advising the other bridge of the identities of the selected destination stations includes:

transmitting messages to the other bridge adding to the set of selected destination stations; and transmitting messages to the other bridge removing selected stations from the set of selected destination stations.

6. A method as defined in claim 3, wherein the step of examining each message received over the spanning tree includes:
   determining whether the received message was received through the spanning tree link through which the spanning tree greeting was received from the other bridge; and, if so,
   dropping the received message as possibly invalid.

7. A method as defined in claim 3, and further including the steps of:
   examining each message received at each bridge through the cross-link;
   determining whether the message destination is valid; and, if so,
   forwarding the message toward its destination station.

8. A method as defined in claim 7, wherein the step of determining if the message destination is valid includes the step of dropping the message if any of the following conditions is true:
   the destination station contained in the message is not in the set of destination stations previously selected by this bridge;
   the destination station contained in the message is located in a direction along the spanning tree link through which the spanning tree greeting was received from the other bridge; and
   the destination station contained in the message is not one whose directional location on the spanning tree is known.

9. A method as defined in claim 1, and further comprising the steps of:
   transmitting from at least one of the two bridges a first timing message destined for the other bridge and coded for transmission over the cross-link;
   transmitting from the same bridge from which the first timing message was transmitted, a second timing message also destined for the other bridge and coded for transmission over the spanning tree;
   measuring propagation times of the first and second messages; and
   modifying the set of destination stations associated with other bridge, in accordance with the measured message propagation times.

10. A method as defined in claim 9, wherein the step of modifying the set of destination stations includes:
   expanding the set of destination stations if the message propagation time through the cross-link is less than the message propagation time through the spanning tree; and
   reducing the set of destination stations if the message propagation time through the cross-link is greater than the message propagation time through the spanning tree.

11. A method as defined in claim 9, wherein:
   the steps of transmitting timing messages and measuring propagation times are performed only when the cross-link is first established; and
   the step of modifying the set of destination stations includes reducing the set to zero if the message propagation time through the cross-link is less than the propagation time through the spanning tree.

12. A method as defined in claim 9, wherein:
   the steps of transmitting timing messages and measuring propagation times and modifying the set of destination stations are performed periodically to optimize usage of the cross-link.

13. For use in a bridged communication network that has been pruned to form a loop-free spanning tree configuration having a root bridge, a method of establishing and using a cross-link between two bridges, such that the cross-link is not in the spanning tree configuration, the method comprising the steps of:
   transmitting a cross-link greeting message from each bridge in the network having inactive links no included in the spanning tree configuration, the cross-link greeting message being transmitted along each of the inactive links and containing the identity of the bridge transmitting the message;
   receiving a cross-link greeting message in at least one bridge that transmitted such a message, wherein the existence of at least one cross-link between two bridges is established and each bridge is made aware of the identity of the other;
   identifying at each of the two bridges a spanning tree link through which communication can take place with the other of the two bridges over the spanning tree;
   selecting at each of the two bridges a set of destination stations for receipt of messages to be transmitted over the cross-link, wherein the stations are selected without regard to their locations relative to the root bridge of the spanning tree configuration, and wherein each selected station is not reached through the spanning tree link leading to the other bridge;
   advising the other of the two bridges of the identities of the selected destination stations;
   examining each message received over the spanning tree at each of the two bridges to determine if the intended destination of the message qualifies as one of the destination stations selected by the other of the bridges;
   forwarding the message over the cross-link if the destination station in the message qualifies;
   examining each message received through the cross-link at each of the two bridges to determine that the message contains a valid destination address; and
   forwarding the message toward its destination station if the destination address qualifies.

14. A method as defined in claim 13, wherein the step of selecting a set of destinations includes the step of:
   excluding stations that are reached through the spanning tree link leading to the other bridge.

15. A method as defined in claim 13, wherein the step of advising the other bridge of the identities of the selected destination stations includes:
   transmitting messages to the other bridge adding to the set of selected destination stations; and
   transmitting messages to the other bridge removing selected stations from the set of selected destination stations.

16. A method as defined in claim 13, wherein the step of examining each message received over the spanning tree includes:
   determining whether the received message was received through the spanning tree link leading to the other bridge; and, if so,
   dropping the received message as possibly invalid.

17. A method as defined in claim 13, wherein the step of examining each message received over the cross-link includes the step of dropping the message if any of the following conditions is true:

the destination station contained in the message is not in the set of destination stations previously selected by this bridge;

the destination station contained in the message is located in a direction along the spanning tree link through which the spanning tree greeting was received from the other bridge; and the destination station contained in the message is not one whose directional location on the spanning tree is known.

18. A method as defined in claim 13, and further comprising the steps of:

transmitting from each of the two bridges a first timing message destined for the other bridge and coded for transmission over the cross-link;

transmitting from each of the two bridges a second timing message destined for the other bridge and coded for transmission over the spanning tree;

measuring propagation times of the first and second messages at the others of the two bridges; and modifying the set of destination stations associated with each of the bridges, in accordance with the measured message propagation times.

19. A method as defined in claim 18, wherein the step of modifying the set of destination stations includes:

expanding the set of destination stations if the message propagation time through the cross-link is less than the message propagation time through the spanning tree; and reducing the set of destination stations if the message propagation time through the cross-link is greater than the message propagation time through the spanning tree.

20. A method as defined in claim 18, wherein:

the steps of transmitting timing messages and measuring propagation times are performed only when the cross-link is first established; and the step of modifying the set of destination stations includes reducing the set to zero if the message propagation time through the cross-link is less than the propagation time through the spanning tree.

21. A method as defined in claim 18, wherein:

the steps of transmitting timing messages and measuring propagation times and modifying the set of destination stations are performed periodically to optimize usage of the cross-link.

22. In a bridged communication network that has been pruned to form a loop-free spanning tree configuration having a root bridge, apparatus for exchanging messages between stations, through a point-to-point cross-link outside the spanning tree configuration, the apparatus comprising:

means for identifying a cross-link between any two bridges in the network, wherein the cross-link exists outside the spanning tree configuration;

means for selecting at each of the two bridges a set of destination stations for receipt of messages to be transmitted over the cross-link, the destination stations being selected without regard to their locations with respect to the root bridge in the spanning tree configuration;

means for advising the other of the two bridges of the identities of the selected destination stations;

means for examining each message received over the spanning tree at each of the two bridges to determine if the intended destination of the message qualifies as one of the destination stations selected by the other of the bridges; and means for forwarding the message over the cross-link if the destination station in the message qualifies.

23. Apparatus as defined in claim 22, wherein the means for identifying a cross-link includes:

means for transmitting a cross-link greeting message from each bridge in the network having inactive links not included in the spanning tree configuration, the cross-link greeting message being transmitted along each of the inactive links and containing the identity of the bridge transmitting the message; and means for receiving a cross-link greeting message in at least one bridge that transmitted such a message, wherein the existence of at least one cross-link between two bridges is established and each bridge is made aware of the identity of the other.

24. Apparatus as defined in claim 23, and further comprising:

means for transmitting a spanning tree greeting message from each of the two bridges, the spanning tree greeting message being transmitted to the other bridge over the spanning tree configuration; and means for recording in each bridge the identity of a spanning tree link through which the spanning tree message from the other bridge is received.

25. Apparatus as defined in claim 24, wherein the means for selecting a set of destinations includes:

means for excluding stations that are reached through the spanning tree link through which the spanning tree greeting was received from the other bridge.

26. Apparatus as defined in claim 22, wherein the means for advising the other bridge of the identities of the selected destination stations includes:

means for transmitting messages to the other bridge adding to the set of selected destination stations; and means for transmitting messages to the other bridge removing selected stations from the set of selected destination stations.

27. Apparatus as defined in claim 22, and further comprising:

means for transmitting from each of the two bridges a first timing message destined for the other bridge and coded for transmission over the cross-link;

means for transmitting from each of the two bridges a second timing message destined for the other bridge and coded for transmission over the spanning tree;

means for measuring propagation times of the first and second messages at the others of the two bridges; and means for modifying the set of destination stations associated with each of the bridges, in accordance with the measured message propagation times.

28. Apparatus as defined in claim 27, wherein the means for modifying the set of destination stations includes:

means for expanding the set of destination stations if the message propagation time through the cross-link is less than the message propagation time through the spanning tree; and means for reducing the set of destination stations if the message propagation time through the cross-link is greater than the message propagation time through the spanning tree.

* * * * *